UNITED STATES PATENT OFFICE.

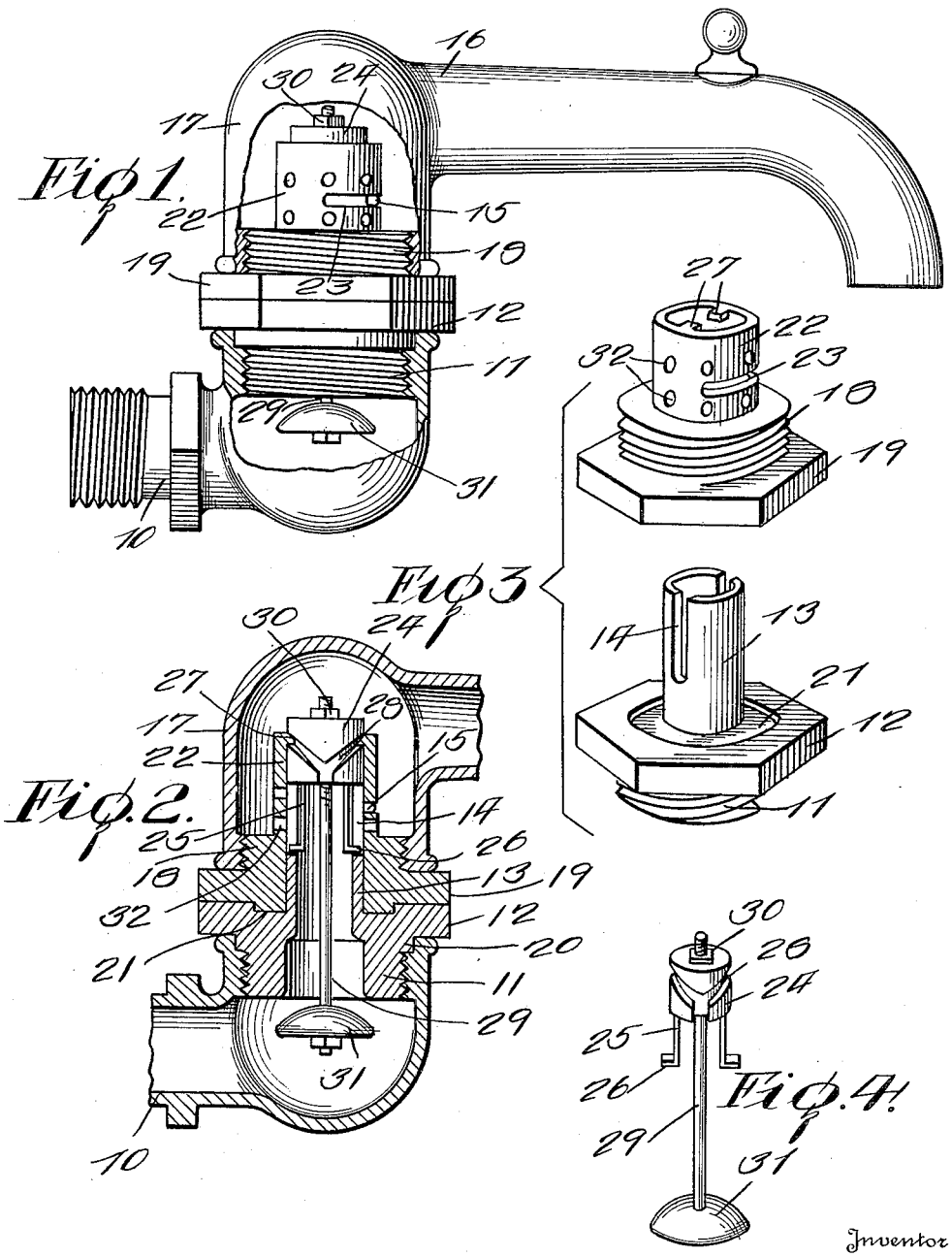

GEORGE M. WOODMAN, OF SCOTIA, NEW YORK.

FAUCET.

1,133,521.  Specification of Letters Patent.  Patented Mar. 30, 1915.

Application filed April 6, 1914. Serial No. 829,933.

*To all whom it may concern:*

Be it known that I, GEORGE M. WOODMAN, a citizen of the United States, residing at Scotia, in the county of Schenectady, State of New York, have invented certain new and useful Improvements in Faucets; and I do hereby declare the following to be a full, clear, and exact description of the invention, such as will enable others skilled in the art to which it appertains to make and use the same.

This invention relates to improvements in faucets and particularly to the reciprocating valve type.

The principal object of the invention is to provide a faucet which is simple and cheap in structure and which may be used in connection with sinks or tubs to permit the ready placing of receptacles within the sinks or tubs and removing the same therefrom.

Another object is to provide a faucet in which the spout or nozzle of the faucet is operable to open and close the valve.

Other objects and advantages will be apparent from the following description, when taken in connection with the accompanying drawings.

In the drawings: Figure 1 is a side elevation of the faucet partly broken away. Fig. 2 is a vertical longitudinal sectional view through a faucet made in accordance with my invention. Fig. 3 is a view showing the bushings of the parts of the faucet in perspective. Fig. 4 is a perspective view of the grooved valve operating member.

Referring particularly to the accompanying drawings, 10 represents an elbow or L which is adapted to be connected to the water supply pipe. The vertical portion of the L is interiorly threaded and receives the bushing 11, said bushing being provided with wrench engaging faces 12. Formed on the upper side of the bushing is a tubular member 13 formed with the vertical open ended slots 14 at diametrically opposite points. On the outer face of the tubular portion is a removable screw 15. The spout or nozzle portion of the faucet is represented at 16 and has a downturned rear portion 17 interiorly threaded and carrying therein a bushing 18. This bushing is also formed with wrench engaging faces 19 and a circular flange 20 on the lower side for engagement in a circular groove 21 formed in the upper face of the bushing 11 around the tubular member 13. On the upper side of the bushing 18 is a tubular extension 22 formed with a horizontal slot 23. The tubular portion 13 is adapted to fit within the tubular portion 22, the screw 15 engaging in the slot 23 to permit a limited relative rotation of one bushing with respect to the other but preventing movement away from each other. A cylindrical member 24 is disposed within the upper end of the tubular portion 22 and is provided on the lower end with the legs 25 having the oppositely disposed and laterally extending feet 26 which engage in the slots 14 of the member 13 so as to prevent rotation of said member 24 when the bushing 18 turns with the spout portion 16. The upper portion of the tubular member 22 carries a pair of inwardly directed and oppositely disposed lugs 27 which engage in the inclined grooves 28 formed in the peripheral face of the member 24. Extending down through the member 24 is a stem 29 adjustable within the member 24 by means of the nut 30 and carrying on its lower end a valve head 31. This valve head is arranged to be seated against the lower threaded end of the bushing 11. The tubular portion 22 is provided with the perforations 32 that register with slot 14 to permit the water to escape into the spout portion 16.

In normal position the lugs 27 are in the lower ends of the grooves 28 and the valve head 31 firmly held against the seat. In this position the nozzle portion 16 will extend in a direction at right angles to the horizontal portion of the nipple 10. The valve is thus closed and water prevented from issuing from the faucet, the spout portion lying against the wall and permitting a bucket or other receptacle being placed in the sink or tub and removed therefrom. With the ordinary rigid faucets, the nozzle portions project out into the sink or tub and occupy a space which makes it difficult for a bucket to be removed from the sink after being filled.

By grasping the spout portion and turning the same so that it will extend at right angles to the wall, the bushing 18 will turn with the spout portion and by the engagement of the lugs 27 in the grooves of the member 24, the member 24 will be forced downwardly, pushing the valve head 31 from its seat. The feet 26 riding in the vertical slots 14 prevent rotation of the member 24 and force the same to move straight up and down. When the spout portion is again swung around into parallel relation with the wall, the lugs 27 will ride in the grooves 28 and force the member 24 straight upward and draw the valve head 31 against its seat.

What is claimed is:

A faucet comprising a stationary portion having a removable bushing formed with a valve seat, a vertical guide on the bushing, a movable spout portion, a removable bushing carried by the spout portion and rotatably engaged on the guide of the first named bushing, a vertically movable member disposed within the said guide, said movable member having inclined grooves in the outer face thereof, a vertical extension on the movable bushing, lugs carried by the extension and engaging in the grooves, a valve carried by the vertically movable member for engagement with the said seat, and means for limiting the rotatable movement of the extension of the rotatable bushing upon the guide of the stationary bushing.

In testimony whereof, I affix my signature, in the presence of two witnesses.

GEORGE M. WOODMAN.

Witnesses:
CLARENCE D. BROWER,
ADNEY A. FINKELL.

Copies of this patent may be obtained for five cents each, by addressing the "Commissioner of Patents, Washington, D. C."